UNITED STATES PATENT OFFICE.

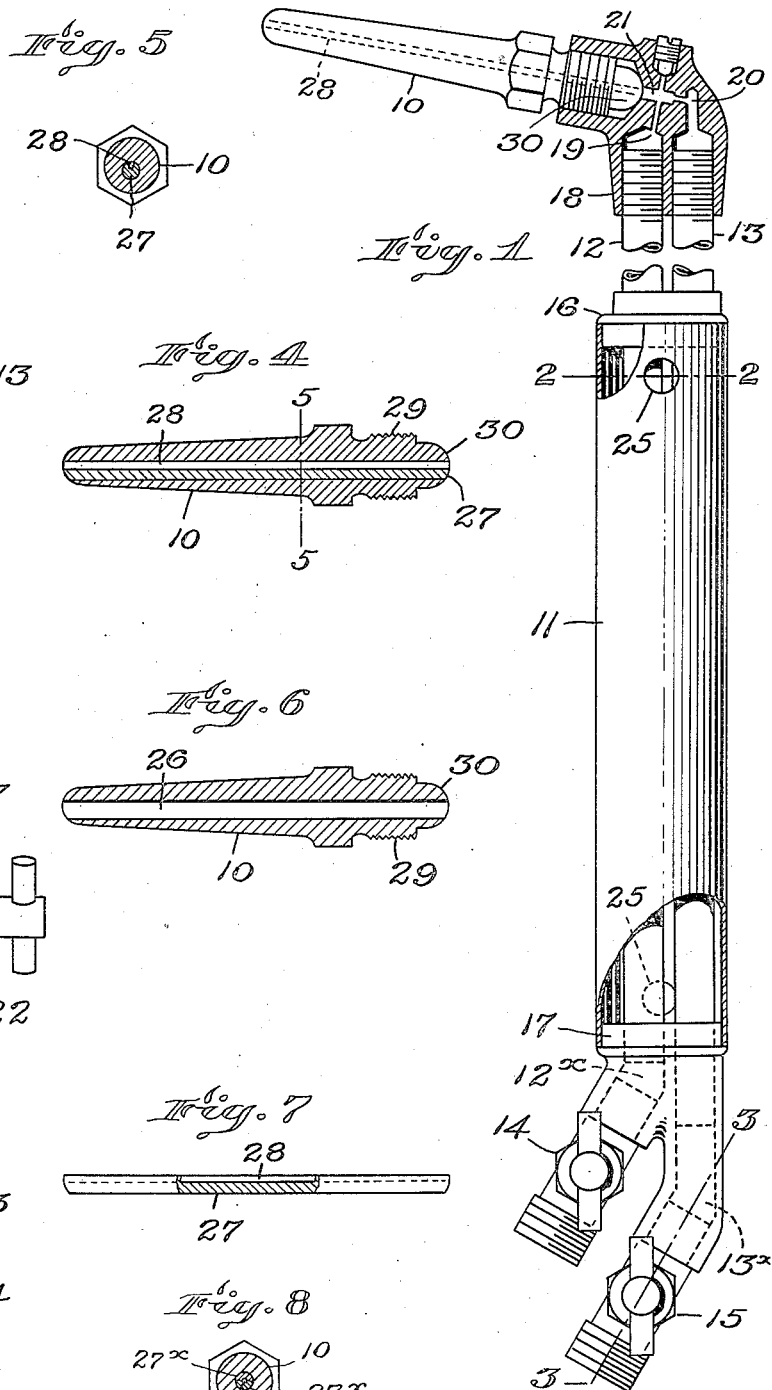
S. H. TOLMAN.
TORCH.
APPLICATION FILED MAY 4, 1912.
1,082,713.
Patented Dec. 30, 1913.

SCOTT H. TOLMAN, OF BOSTON, MASSACHUSETTS.

TORCH.

1,082,713.  Specification of Letters Patent.  Patented Dec. 30, 1913.

Application filed May 4, 1912. Serial No. 695,190.

*To all whom it may concern:*

Be it known that I, SCOTT H. TOLMAN, a citizen of the United States, and resident of Boston, in the county of Suffolk and State of Massachusetts, have invented certain new and useful Improvements in Torches, of which the following is a specification.

The object of the present invention is to provide a torch especially adapted for welding.

The most important feature of the invention is the construction of the burner, in which a fuel passage of relatively small cross-sectional area and of great length is obtained by a combination of parts which provide a passage of the desired size without requiring the use of a drill as small as the cross section of the passage.

Of the accompanying drawings which illustrate the invention: Figure 1 represents a side elevation, partly in section, of a complete torch. Fig. 2 represents a section in the plane indicated by line 2—2 of Fig. 1. Fig. 3 represents a section in a plane indicated by line 3—3 of Fig. 1. Fig. 4 represents a longitudinal section of one form of burner. Fig. 5 represents a cross section through the same, as indicated by line 5—5 of Fig. 4. Fig. 6 represents a longitudinal section of the burner, omitting the filling piece which is included in Figs. 4 and 5. Fig. 7 represents a side elevation, partly in section, of the said filling piece. Fig. 8 represents a cross section of a modification.

The same reference characters indicate the same parts wherever they occur.

The torch illustrated by Fig. 1 comprises a burner 10, a handle 11, tubes or pipes 12 and 13 for the combustible gases, and valves 14 and 15 for regulating the supply of the gases. The handle 11 is of tubular formation, and the pipes 12 and 13 extend through the same. A head 16 is fastened in one end of the tubular handle, and a head 17 is secured in the opposite end. These heads are bored for the reception of the pipes 12 and 13, and the head 17 is further provided with offset portions in which the valves 14 and 15 are secured. A passage 12ˣ in the head 17 conducts the gas from the valve 14 to the pipe 12, while a passage 13ˣ conducts gas from the valve 15 to the pipe 13. The opposite ends of the pipes 12 and 13 are threaded or otherwise secured in an elbow 18. The burner 10 is also screw-threaded in the elbow 18. Gas is conducted from the pipe 12 by a passage 19, and that from the pipe 13 is conducted by a passage 20. The passages 19 and 20 both deliver into a passage 21 which registers with a passage in the burner hereinafter described.

The valves 14 and 15 are screw-threaded for connection with a union such as that indicated at 22. (See Fig. 3). The union is formed with a nipple 23 for connecting a flexible conduit 24 to the valve. The combustible gases are conducted to the torch by the flexible conduits which permit the desired manipulation of the torch. The tubular handle 11 is provided with openings such as those indicated at 25, to permit free circulation of air through the handle to prevent the same from becoming overheated.

Referring to Figs. 4, 5 and 6, the burner 10 is formed with a longitudinal fuel passage 26. It will be observed that this passage is eccentric with relation to the axis of the burner, but that the said axis lies within the passage. The cross-sectional area of the passage 26 is such as to receive a filling piece 27. (See Fig. 7). This filling piece has a longitudinal groove 28 in its exterior. The passage 26 and the groove 28 are so formed as to provide a restricted fuel passage, when the filling piece is inserted in the burner in the relation shown by Figs. 4 and 5. It will be observed that the restricted fuel passage thus formed is concentric with relation to the axis of the burner, and consequently the groove 28 registers with the passage 21 when the burner is secured in the elbow 18. The threaded portion of the burner by which it is secured to the elbow, is indicated at 29. The inner end of the burner is made hemispherical, as indicated at 30, whereby a tight joint is made between the burner and the elbow 18.

The burner is preferably made longer than is actually necessary, because its outer end becomes burned away by the extreme heat of the welding flame. The burner must therefore be of sufficient length to allow for considerable burning away, for the sake of economy; for otherwise it would be necessary to replace the burners so frequently as to render the cost prohibitive. Now, while it is desirable to have a long burner, it is impossible, or at least extremely difficult, to bore a hole of sufficiently restricted cross-sectional area throughout a burner of the length shown. If it were attempted to bore a hole of the same proportions as the groove 28, the drill would probably break, or, if it did not break it would not bore in a straight line; so that even if the drilled hole were concentric at one end of the burner it would be eccentric at the other end. In practice, the fuel passage must be concentric at both ends. If it were not concentric at the inner end it would not register with the passage 21 in the elbow 18, and if it were not concentric at the outer end the burner would burn away more rapidly at the side toward which the passage were inclined. These difficulties are overcome by drilling through the burner with a drill of sufficient diameter to operate accurately upon a burner of the desired length. The hole formed by a drill of such diameter is far too great for the purpose of a welding torch, and for this reason the filling piece 27 is inserted. Inasmuch as the groove 28 is formed in one side of the filling piece, and inasmuch as it is necessary to have the axis of the restricted fuel passage coincident with the axis of the burner, the passage 26 is drilled eccentrically. When the filling piece is inserted it must be positioned rotatively to cause the axis of the groove 28 to coincide with the axis of the burner. The filling piece is secured in any desired manner, as by brazing, or it may be made to fit so tightly as to be held by friction when it is driven in. The greater proportion of stock in the filling piece on the side diametrically opposite the groove compensates for the loss of stock upon one side of the burner, so that when the restricted fuel passage is coextensive with the axis of the burner the latter will burn away evenly instead of burning away faster on one side than elsewhere. The same result may be obtained in another way, which, however, is similar in that the nozzle is initially drilled with a drill of relatively large diameter, and the passage thereby formed is partly filled by a plurality of grooved pieces which leave the restricted passage. In the modification shown by Fig. 8 the enlarged passage formed in the burner 10 is concentric with relation to the exterior of the burner. The filling means comprises two semi-cylindric members $27^x$ whose confronting faces are grooved to form the restricted passage $28^x$.

I claim:

1. A burner comprising a tubular outer element and a filling element fitted tightly therein, one of said elements being grooved longitudinally to provide a passageway for fuel, the perimeter of said outer element being concentric relatively to said passageway.

2. A burner comprising a tubular outer member and a filling member fitted tightly therein, the external and internal surfaces of said outer member being eccentric as to each other, one of said members having a longitudinal feed groove for fuel in the surface confronting the other of said members, said groove being concentric as to the perimeter of said outer member.

In testimony whereof I have affixed my signature, in presence of two witnesses.

SCOTT H. TOLMAN.

Witnesses:
 WALTER P. ABELL,
 PETER W. PEZZETTI.